United States Patent
Weyer, Jr. et al.

(10) Patent No.: US 7,896,028 B2
(45) Date of Patent: Mar. 1, 2011

(54) FLOW RESTRICTED SEAT RING FOR PRESSURE REGULATORS

(75) Inventors: Thomas L. Weyer, Jr., Little Elm, TX (US); Daniel G. Roper, Lucas, TX (US); James L. Griffin, Jr., McKinney, TX (US); Harold J. McKinney, Durant, OK (US); Douglas J. Scheffler, McKinney, TX (US)

(73) Assignee: Fisher Controls International LLC, St. Louis, MO (US)

( * ) Notice: Subject to any disclaimer, the term of this patent is extended or adjusted under 35 U.S.C. 154(b) by 270 days.

(21) Appl. No.: 11/462,473

(22) Filed: Aug. 4, 2006

(65) Prior Publication Data

US 2008/0029171 A1    Feb. 7, 2008

(51) Int. Cl.
*F16K 1/34* (2006.01)
(52) U.S. Cl. .................. 137/625.33; 251/282; 251/357; 251/362
(58) Field of Classification Search ............ 137/625.33, 137/625.5; 251/118, 282, 357, 360, 362
See application file for complete search history.

(56) References Cited

U.S. PATENT DOCUMENTS

| | | | | |
|---|---|---|---|---|
| 2,667,892 A | * | 2/1954 | Gentzel | 137/473 |
| 2,735,444 A | * | 2/1956 | Mueller et al | 137/505.44 |
| 3,105,517 A | * | 10/1963 | Alfieri | 251/332 |
| 3,230,973 A | * | 1/1966 | Schork et al. | 137/625.33 |
| 4,489,754 A | * | 12/1984 | Seessle et al. | 251/118 |
| 4,558,844 A | * | 12/1985 | Donahue, Jr. | 251/118 |
| 4,621,772 A | | 11/1986 | Blythe et al. | |
| 4,790,348 A | * | 12/1988 | Gausman et al. | 137/516.29 |
| 6,076,801 A | | 6/2000 | DuHack et al. | |
| 2003/0089398 A1 | | 5/2003 | Hall et al. | |
| 2005/0109967 A1 | | 5/2005 | Ohmi et al. | |

FOREIGN PATENT DOCUMENTS

| | | |
|---|---|---|
| EP | 0 740 071 | 10/1996 |
| JP | 8-28407 | 1/1996 |

(Continued)

OTHER PUBLICATIONS

Emerson Process Management, "Type EZH Pressure Reducing Regulator," *Instruction Manual Form 5757* (2005).

(Continued)

*Primary Examiner*—John Fox
(74) *Attorney, Agent, or Firm*—Marshall, Gerstein & Borun LLP

(57) ABSTRACT

A control device includes a valve body, a seat ring, and an actuator. The valve body defines a flow-path for a fluid. The seat ring is disposed within the flow-path. The actuator is coupled to the valve body and includes a control member. The control member is adapted for displacement relative to the seat ring for regulating a flow of the fluid through the flow-path. The control member includes a scaling disk adapted to sealingly engage the seat ring and close the flow-path. The seat ring includes an orifice disposed within the flow-path such that the seat ring prevents at least a portion of the flow of the fluid from substantially perpendicularly impacting the sealing disk.

18 Claims, 4 Drawing Sheets

FOREIGN PATENT DOCUMENTS

JP  8-28785  2/1996

OTHER PUBLICATIONS

Emerson Process Management, "Type EZL Pressure Reducing Regulator for Low Pressure Applications," *Bulletin 71.2:EZL* (2008).

Emerson Process Management, "Type EZL Pressure Reducing Regulator for Low Pressure Applications," *Instruction Manual Form 5781* (2008).

Fisher Controls, "Aluminum 2011-T3 7/8 HEX," Drawing No. T13485.

International Search Report for International Application No. PCT/US2007/014529, dated Mar. 17, 2008.

Written Opinion for International Application No. PCT/US2007/014529, dated Mar. 17, 2008.

International Preliminary Report on Patentability for Application No. PCT/US2007/014529, dated Feb. 10, 2009.

English-language translation and original copy of Second Office Action for Chinese Patent Application No. 200780029136.3, dated Oct. 28, 2010.

English-language translation of First Office Action for Chinese Application No. 200780029136.3, dated May 25, 2010.

\* cited by examiner

PRIOR ART

FLOW RESTRICTED SEAT RING FOR PRESSURE REGULATORS

FIELD OF THE DISCLOSURE

The present disclosure generally relates to fluid control devices and, more particularly, to seat rings for fluid control devices.

BACKGROUND

Fluid control devices include various categories of equipment including control valves and regulators. Such control devices are adapted to be coupled within a fluid process control system such as chemical treatment systems, natural gas delivery systems, etc., for controlling the flow of a fluid therethrough. Each control device defines a fluid flow-path and includes a control member for adjusting a dimension of the flow-path. For example, FIG. 1 depicts a known regulator assembly 10 including a valve body 12 and an actuator 14. The valve body 12 defines a flow-path 16 and includes a throat 18. In FIG. 1, the regulator assembly 10 is configured in a flow-up configuration. The actuator 14 includes an upper actuator casing 20, a lower actuator casing 22, and a control member 24. The control member 24 is disposed within the upper and lower actuator casings 20, 22 and is adapted for bi-directional displacement in response to changes in pressure across the regulator assembly 10. So configured, the control member 24 controls the flow of fluid through the throat 18. Additionally, as is depicted, the regulator assembly 10 includes a seat ring 26 disposed in the throat 18 of the valve body 12. When the outlet pressure of the valve body 12 is high, a sealing surface 28 of the control member 24 may sealingly engage the seat ring 26 and close the throat 18. This prevents the flow of fluid through the regulator 10.

FIG. 1 depicts the regulator assembly 10 equipped with one known seat ring 26. The seat ring 26 includes a generally ring-shaped body secured in the throat 18. The seat ring 26 includes a seating surface 30 and an orifice 32. As mentioned, the seating surface 30 is adapted to be engaged by the sealing surface 28 of the control member 24 when in a closed position to prevent the fluid from flowing through the valve body 12. The seat ring 26 depicted in FIG. 1 further includes a rounded or tapered surface 34. The rounded or tapered surface 34 serves to streamline the flow of the fluid through the orifice 32. Additionally, it can be seen in FIG. 1 that a diameter of the seating surface 30 is substantially equal to both a diameter of the orifice 32 of the seat ring 26, as well as a diameter of the sealing surface 28 of the control member 24. Therefore, as fluid flows through the valve body 12, it flows from the left of the valve body 12, as depicted in FIG. 1 and up through the throat 18 via the orifice 32 in the seat ring 26. Then, the fluid deflects off a lower surface of the control member 24 including the sealing surface 28, and out to the right of the valve body 12 of FIG. 1.

One shortcoming of the above-described regulator assembly 10 is that the orifice 32 includes a diameter that is close to a diameter of the sealing surface 28 of the control member 24. Often times, such a pressure regulator assembly 10 is implemented into a fluid delivery system for delivering natural gas. Natural gas tends to include debris or particulate matter that, when traveling through the regulator assembly 10, can damage the regulator assembly 10. For example, as debris or particulate matter traveling under high pressure travels through the orifice 32 in the seat ring 26, it impacts the sealing surface 28 of the control member 24. Typical sealing surfaces 28 are constructed of rubber. Upon impact, the debris or particulate matter can damage the rubber and thereby effect the performance of the regulator.

SUMMARY OF THE DISCLOSURE

One aspect of the present disclosure includes a seat adapted for sealing engagement with a control member. The seat controls the flow of a fluid through a flow-path of a control device. The seat includes a seating surface and at least one orifice. The sealing surface is adapted for sealing engagement with the sealing disk. The at least one orifice is disposed in the flow-path and contoured to prevent at least a portion of the fluid flowing through the flow-path from directly impacting at least a portion of the control member.

According to another aspect, the seating surface has a first diameter and the at least one orifice has a second diameter. The second diameter is substantially smaller than the first diameter.

According to another aspect, the at least one orifice includes a plurality of orifices. The plurality of orifices direct the fluid through the flow-path.

According to yet another aspect, the seat further includes a substantially cylindrical inner surface. The inner surfaces defines the at least one orifice as having a longitudinal axis disposed substantially perpendicularly to a plane in which the seating surface resides. According to still another aspect, the seat substantially cylindrical inner surface defines the at least one orifice as having a longitudinal axis disposed at an angle relative to a plane in which the seating surface resides. In one form, the angle is less than ninety-degrees.

According to still yet another aspect, the seat further includes a substantially frustoconical inner surface defining the at least one orifice.

DETAILED DESCRIPTION OF THE DISCLOSURE

Figure 1:
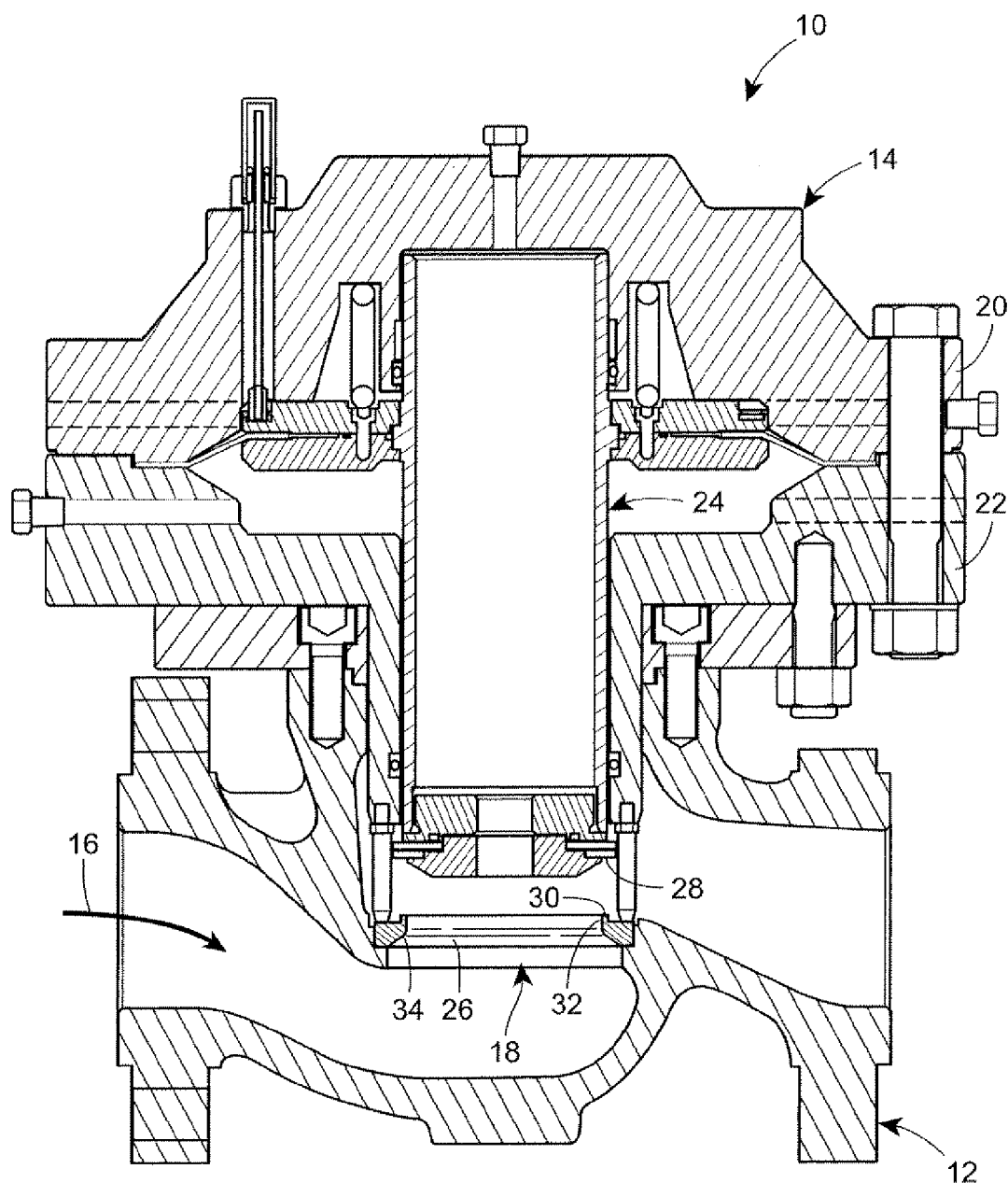
FIG. 1 is a cross-sectional side view of a regulator assembly including a known seat ring.
Figure 2:
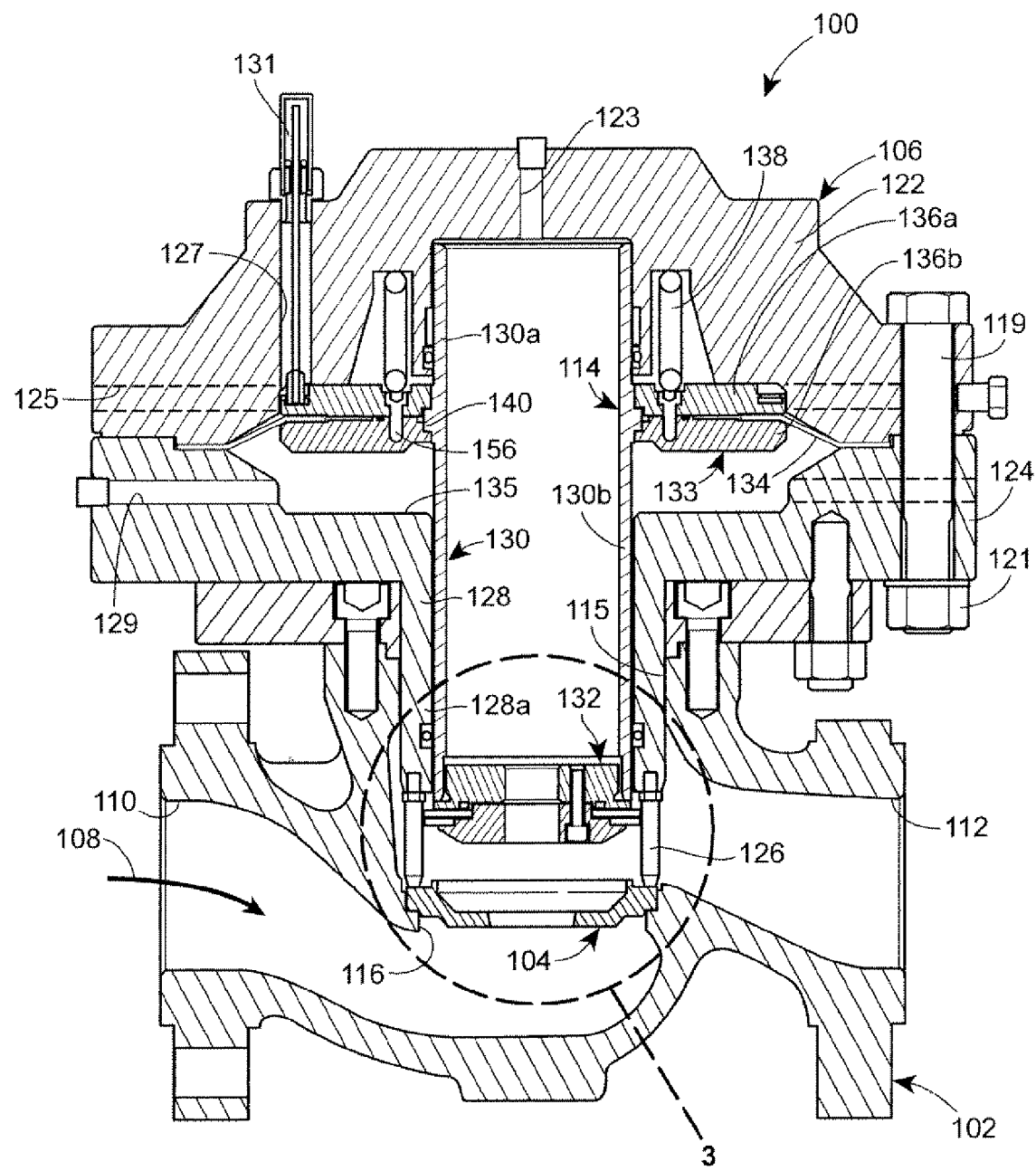
FIG. 2 is a cross-sectional side view of a regulator assembly incorporating one form of a seat ring constructed in accordance with the principles of the present disclosure.
Figure 3:
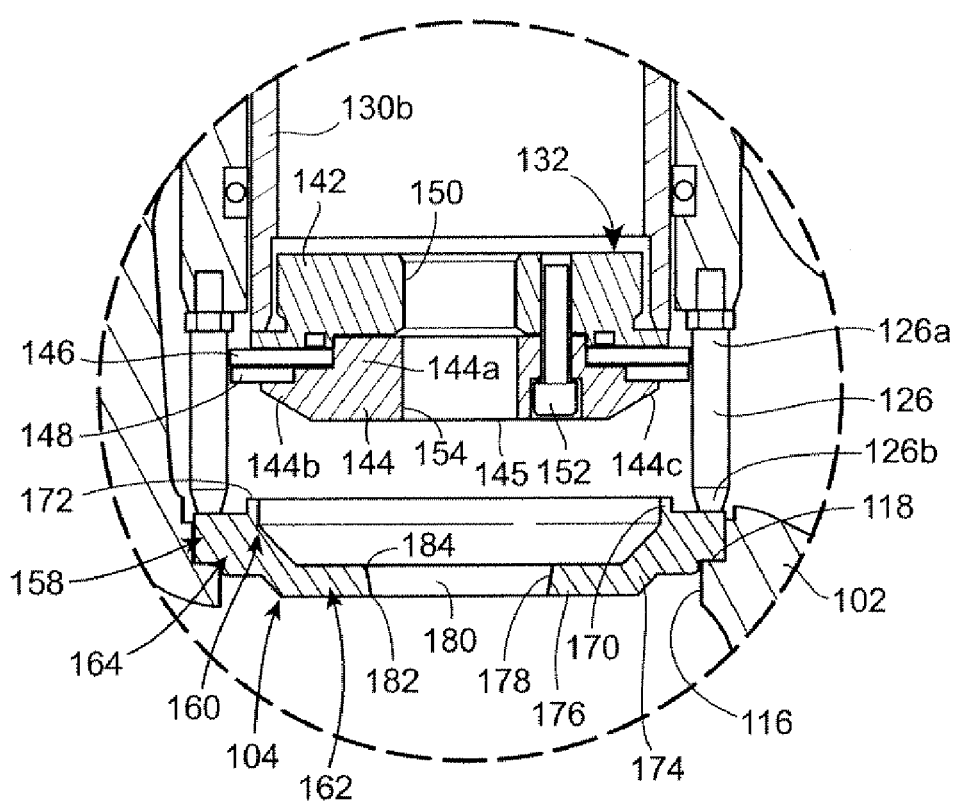
FIG. 3 is a partial cross-sectional side view of the regulator assembly of FIG. 2 taken from circle 3 of FIG. 2.
Figure 4:
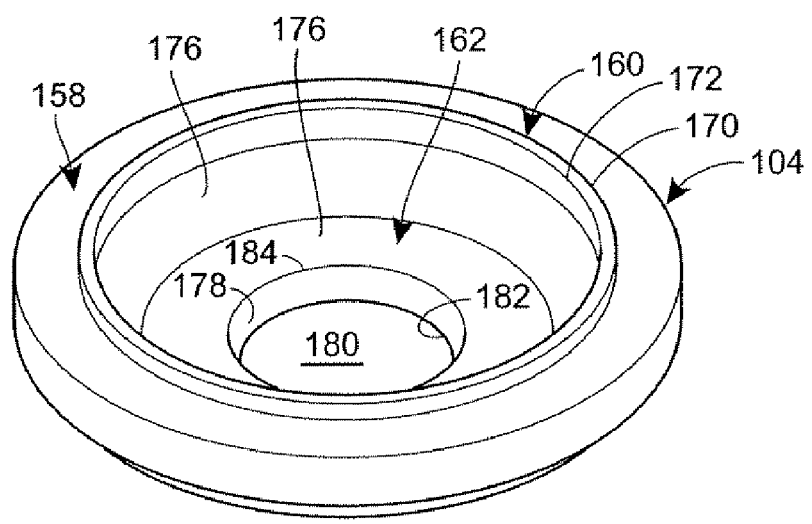
FIG. 4 is a perspective view of the seat ring of FIGS. 2 and 3.

Referring to FIGS. 2-4, a control device in accordance with the principles of the present disclosure includes a pressure regulator 100. The pressure regulator 100 generally includes a valve body 102, a seat ring 104, and an actuator 106. The valve body 102 defines a flow-path 108 extending between an inlet 110 and an outlet 112. The actuator 106 includes a control assembly 114 that is moveable between an open position, as is shown in FIG. 1, and a closed position, wherein the control assembly 114 engages the seat ring 104. Movement of the control assembly 114 occurs in response to fluctuations in the pressure of the fluid traveling through the flow-path 108. Accordingly, the position of the control assembly 114 relative to the seat ring 104 effects a flow capacity of the pressure regulator 100.

Referring specifically to FIGS. 2 and 3, the valve body 102 further defines a throat 116 between the inlet 110 and the outlet 112. The throat 116 includes a stepped portion 118 accommodating and supporting the seat ring 104. In one form, an o-ring may be disposed between the seat ring 104 and the stepped portion 118 of the throat 116 to provide a fluid-tight seal therebetween.

Referring back to FIG. 2, the actuator 106, as stated above, includes the control assembly 114 and additionally, an upper actuator casing 122, a lower actuator casing 124 and a plurality of pins 126 (shown in more detail in FIG. 3). The upper and lower actuator casings 122, 124 are secured together by at least one threaded fastener 119 and corresponding nut 121. The upper actuator casing 122 defines an auxiliary outlet 123, a first control inlet 125 (depicted in phantom), and a travel chamber 127. The travel chamber 127 contains a travel indicator 131, which indicates the position of the control assembly 114 within the actuator 106. The lower actuator casing 124 defines a second control inlet 129.

In cooperation, the upper and lower actuator casings 122, 124 define a cavity 135 including a hollow neck 128. The hollow neck 128 includes a lower portion 128a disposed within an actuator opening 115 in the valve body 102. As identified in FIG. 3, the plurality of pins 126 have first ends 126a fixed to the lower portion 128a of the hollow neck 128 and second ends 126b located distally to the lower portion 128a of the hollow neck 128. In the form illustrated, the first ends 126a are threaded into bores formed in the hollow neck 128. The second ends 126b engage the seat ring 104. Accordingly, the pins 126 and the stepped portion 118 of the throat 116 sandwich and axially locate and secure the seat ring 104 in the valve body 102. While the regulator 100 has been described as including a plurality of pins 126 locating the seat ring 104 relative to the valve body 102, an alternate form of the regulator 100 may include a cage disposed in the throat 116 to locate the seat ring 104. In another form, the seat ring 104 may be threaded, adhered, or otherwise fixed to the valve body 102.

Still referring to FIG. 2, the control assembly 114 includes a tubular member 130, a mounting subassembly 132, and a reaction subassembly 133. The tubular member 130 includes an upper end 130a disposed within the cavity 135 and a lower end 130b disposed within the hollow neck 128. The upper end 130a of the tubular member 130 is open and includes a circumferential flange 140. The lower end 130b of the tubular member 130 is open and accommodates the mounting subassembly 132.

Referring to FIG. 3, the mounting subassembly 132 includes a mounting member 142, a disk retainer 144, a disk holder 146, and a sealing disk 148. In the disclosed form, the mounting member 142 includes a generally cylindrical body threaded into the open lower end 130b of the tubular member 130 and defining a through-bore 150. The through-bore 150 is generally axially aligned with the tubular member 130. The disk retainer 144 includes a generally cylindrical body fixed to the mounting member 142 with a fastener 152. In the form illustrated, the fastener 152 includes a threaded fastener. Similar to the mounting member 142, the disk retainer 144 defines a through-bore 154. The through-bore 154 of the disk retainer 144 has a diameter substantially identical to a diameter of the through-bore 150 in the mounting member 142 and is axially aligned therewith.

Additionally, as shown in FIG. 3 the disk retainer 144 includes a central cylindrical portion 144a and a rim portion 144b extending radially outward of the central portion 144a. The central cylindrical portion 144a and the rim portion 144b define a substantially flat bottom surface 145. The rim portion 144b includes a chamfered surface 144c for seating into the seat ring 104. The rim portion 144b locates and secures the disk holder 146 and the sealing disk 148 relative to the tubular member 130. The disk holder 146 includes a generally ring-shaped plate constructed of a rigid material such as steel. The sealing disk 148 includes a generally ring-shaped disk made of a resilient material and fixed to the disk holder 146. In one form, the sealing disk 148 is fixed to the disk holder 146 with an adhesive. In accordance with the disclosed form, the configuration of the disk retainer 144 limits radial deformation of the sealing disk 148 when the control assembly 114 is in a closed position compressing the sealing disk 148 against the seat ring 104.

Referring now to the upper portion of the regulator 100 depicted in FIG. 2, the reaction subassembly 133 includes a diaphragm 134, an upper diaphragm plate 136a, a lower diaphragm plate 136b, and a spring 138. The upper and lower diaphragm plates 136a, 136b are clamped onto the circumferential flange 140 of the tubular member 130. The diaphragm plates 136a, 136b are secured together via fasteners 156, thereby fixing the tubular member 130 and the diaphragm plates 136a, 136b together. Additionally, the diaphragm plates 136a, 136b sandwich a radially inward portion of the diaphragm 134. A radially outward portion of the diaphragm 134 is fixed between the upper and lower actuator casings 122, 124. The spring 138 is disposed within the cavity 135 formed by the upper and lower actuator casings 122, 124 and between the upper actuator casing 122 and the upper diaphragm plate 136. In the form disclosed, the spring 138 includes a coil spring biasing the entire control assembly 114 including the diaphragm plates 136a, 136b, the tubular member 130, and the mounting subassembly 132 to a predetermined position relative to the actuator casings 122, 124.

In general, when the regulator assembly 100 is installed within a fluid process control system, the control assembly 114 is able to reciprocally displace within the cavity 135 and hollow neck 128 of the actuator 106 according to a pressure of the fluid traveling through the valve body 102. Specifically, fluid flows from the inlet 110 of the valve body 102 and through the throat 116. Once the fluid passes through the throat 116, a substantial portion of the fluid flows to the outlet 112 while the remainder flows through the through-bores 150, 154 in the mounting member 142 and disk retainer 144. That portion of the fluid continues to flow through the tubular member 130 and out the auxiliary outlet 123. In one form, the fluid flowing out of the auxiliary outlet 123 may be directed back into the fluid process control system to supply, for example, a pilot system, via a fluid line (not shown). The portion of the fluid that flows through the valve body 102 and to the outlet 112 also flows back into the fluid process control system. Specifically, in one form, a portion of the pressure of the fluid at the outlet 112 is bled off into another fluid line (not shown) and directed to the first control inlet 125 in the upper actuator casing 122. Hence, the pressure at the outlet 112 of the valve body 102 equals the pressure at the first control inlet 125, which is ultimately applied to the upper diaphragm plate 136a. Therefore, under high-pressure, low-flow conditions, the pressure at the outlet 112 of the valve body 102 forces the diaphragm plates 136a, 136b and the control assembly 114 downward with the bias of the spring 138. Alternately, under high-pressure, low-flow conditions, the spring 138 forces the diaphragm plates 136a, 136b and the control assembly 114 downward with the pressure at the outlet 112 of the valve body 102 toward the open position depicted in FIG. 2. The sum of the downward forces s opposed by a controlling pressure acting through the inlet 129 to position the valve according to the flow required to meet the downstream demand.

With specific reference now to FIGS. 3 and 4, the seat ring 104 according to one form of the present disclosure will be described. The seat ring 104 includes a generally ring-shaped body having a fixation portion 158, a seating portion 160, and an obstruction portion 162. The seating portion 160 is disposed radially between the fixation and obstruction portions 158, 162. The fixation portion 158 includes a mounting shoulder 164. As depicted in FIG. 3, the mounting shoulder 164 engages the stepped portion 118 of the throat 116 to support the seat ring 104. In the form disclosed, the engagement of the mounting shoulder 164 of the seat ring 104 axially and radially locates the seat ring 104 relative to the valve body 102.

The seating portion 160 of the seat ring 104 extends radially inward of the fixation portion 158 and includes a seating flange 170 defining a seating surface 172, which is identified most clearly in FIG. 4. The seating flange 170 includes a substantially cylindrical protrusion extending upward from the seat ring 104 such that the seating surface 172 is disposed opposite the sealing disk 148, as depicted in FIGS. 2 and 3. Accordingly, when the control assembly 114 travels to a closed position, the sealing disk 148 axially engages and seals against the seating surface 172.

The obstruction portion 162 of the seat ring 104 extends radially inward of the seating portion 160 and includes a transition portion 174 and an interference portion 176. The transition portion 174 includes a hollow generally frustoconical member extending radially inward and axially downward from the seating portion 160. The interference portion 176 includes a generally ring-shaped member having an inner surface 178 defining an orifice 180 in the seat ring 104. The orifice 180 allows for the passage of fluid through the valve body 102 when the control assembly 114 is in an open position and through the mounting assembly 132 into the tubular member 130 when in both the open and closed positions, as discussed above with reference to FIG. 2. The inner surface 178 of the interference portion 176 includes a substantially frustoconical surface having an inlet rim 182 and an outlet rim 184. The inlet rim 182 has a diameter that is less than a diameter of the outlet rim 184, thereby defining a substantially frustoconical orifice 180. Additionally, the inlet and outlet rims 182, 184 each include diameters that are substantially less than a diameter of both the seating flange 170 and the sealing disk 148. Thus, the orifice 180 includes an average diameter that is substantially less than the diameter of the seating flange 170 and the sealing disk 148.

Accordingly, while fluid flows through the orifice 180, the inner surface 178 including the inlet and outlet rims 182, 184 direct the fluid through the seat ring 104 and toward the bottom surface 145 of the disk retainer 144. As mentioned above, a portion of the fluid travels through the through-bores 150, 154 in the disk retainer 144 and mounting member 142, respectively, and into the tubular member 130. The remainder of the fluid impacts the bottom surface 145 of the disk retainer 144 and deflects substantially perpendicularly thereto and toward the outlet 112 of the valve body 102. Thus, the fluid travels substantially parallel to the sealing disk 148. The disclosed form of the seat ring 104 prevents the fluid and/or any debris or particulate matter contained in the fluid from perpendicularly impacting the sealing disk 148.

Figure 5A:
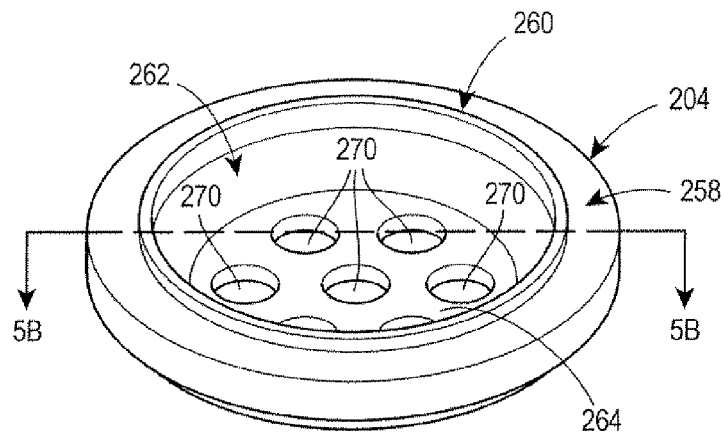
FIG. 5A is a perspective view of another form of a seat ring constructed in accordance with the principles of the present disclosure.
Figure 5B:
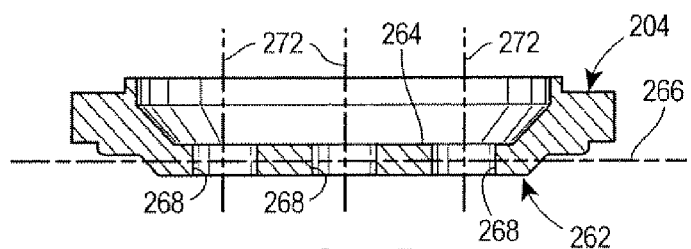
FIG. 5B is a cross-sectional side view of the seat ring of FIG. 5A taken through line 5B-5B of FIG. 5A.

FIGS. 5A and 5B depict an alternate form of a seat ring 204 constructed in accordance with the principles of the present disclosure. Similar to the seat ring 104 described above in reference to FIGS. 3 and 4, the seat ring 204 includes a fixation portion 258, a seating portion 260, and an obstruction portion 262. The fixation portion 258 and seating portion 260 are identical to that described above and, therefore, will not be described in detail. The obstruction portion 262, however, includes a plate portion 264. The plate portion 264 is generally flat and lies within a plane 266 (shown in FIG. 5B) that is substantially perpendicular to the flow of fluid through the throat 116 of the valve body 102. The plate portion 264 includes a plurality of cylindrical surfaces 268 extending therethrough and defining a plurality orifices 270. The plurality of orifices 270 allow for the passage of fluid through the seat ring 204. Each of the cylindrical surfaces 268 include a longitudinal axis 272 that is substantially perpendicular to the plane 266 occupied by the plate portion 264. Additionally, each of the plurality of orifices 270 are disposed substantially radially inward of the seating flange of the seat ring 204 and sealing disk 148 of the control assembly 114.

Accordingly, while fluid flows through the seat ring 204, the plurality of orifices 270 direct the fluid toward the bottom surface 145 of the disk retainer 144. As mentioned above, a portion of the fluid travels through the through-bores 150, 154 in the disk retainer 144 and mounting member 142, respectively, and into the tubular member 130. The remainder of the fluid impacts the bottom surface 145 of the disk retainer 144 and deflects substantially perpendicularly thereto and toward the outlet 112 of the valve body 102. Thus, the fluid travels substantially parallel to the sealing disk 148. Similar to the seat ring 104 discussed above, the disclosed form of the seat ring 204 prevents the fluid and/or the debris or particulate matter in the fluid from perpendicularly impacting the sealing disk 148.

Figure 6A:
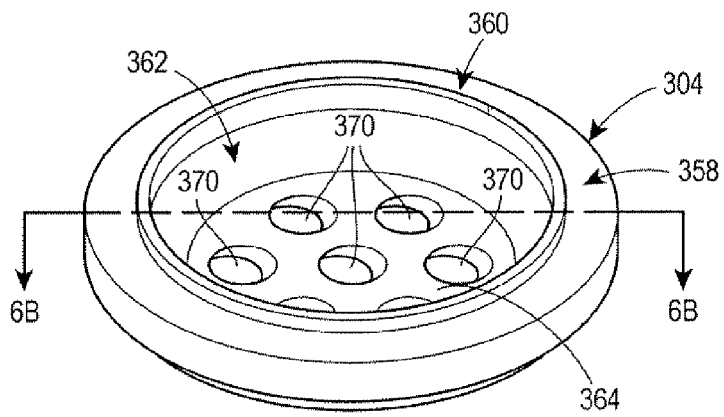
FIG. 6A is a perspective view of another form of a seat ring constructed in accordance with the principles of the present disclosure.
Figure 6B:
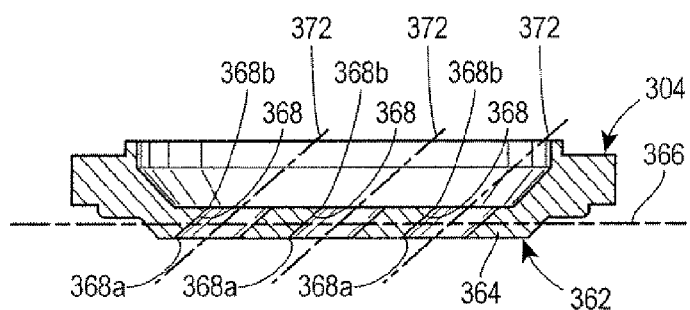
FIG. 6B is a cross-sectional side view of the seat ring of FIG. 6A taken through line 6B-6B of FIG. 6A.

FIGS. 6A and 6B depicts a seat ring 304 that is a variation on the seat ring 204 depicted in FIGS. 5A and 5B. Particularly, the seat ring 304 is configured similar to the seat ring 204 described above and includes a plate portion 364 disposed in a plane 366 (shown in FIG. 6B). The plane 366 is substantially perpendicular to the flow of the fluid through the throat 116 of the valve body 102. The plate portion 364 includes a plurality of cylindrical surfaces 368 defining a plurality of orifices 370. Each of the orifices 370 are disposed radially inward of the seating flange of the seat ring 304 and the sealing disk 148 of the control assembly 114. Each of the cylindrical surfaces 368 includes an inlet rim 368a and an outlet rim 368b. In the form depicted, the inlet and outlet rims 368a, 368b are substantially equal in diameter. The inlet rims 368a are offset from their corresponding outlet rims 368b such that each of the orifices 370 depicted in FIG. 6 includes a longitudinal axis 372 that is disposed at an angle relative to the plane 366. The angle of each of the longitudinal axes 372 of the orifices 370 is less than ninety-degrees.

Accordingly, upon installation of the seat ring 304 into a regulator 100, the seat ring 304 is oriented such that the inlet rims 368a are disposed toward the inlet 110 of the valve body 102 and the outlet rims 368b are disposed toward the outlet 112 of the valve body 102. So configured, the orifices 370 direct the flow of the fluid at an angle through the seat ring 304. As described above with reference to the seat ring 204 depicted in FIGS. 5A and 5B, a portion of the fluid is directed into the bottom surface 145 of the disk retainer 144. Unlike the seat ring 204 depicted in FIGS. 2-5, however, the seat ring 304 depicted in FIGS. 6A and 6B directs the fluid at an angle into the disk retainer 144. Therefore, upon impacting the bottom surface 145 of the disk retainer 144, the fluid inherently deflects toward the outlet 112 of the valve body 102 such as to travel substantially parallel to the sealing disk 148.

In accordance with the disclosed forms of the present disclosure, it should be appreciated that the seat ring 104, 204, 304 directs the flow of fluid through the valve body 102 substantially parallel to the rubber sealing disk 148, thereby optimizing the useful life of the sealing disk 148. In addition, it should be appreciated that different seat rings having different configurations defining different flow-paths are included within the scope of the present disclosure. As such, the present disclosure provides for a flow controlling seat ring that may be substituted by another flow controlling seat ring constructed in accordance with the principles of the present disclosure to accommodate a different application for the pressure regulator or other control device in which the seat ring is incorporated.

Additionally, it should be appreciated that while the foregoing disclosure has described, in reference to FIGS. 3 and 4, a form of a seat ring 104 including a frustoconical inner surface 178 defining a single frustoconical orifice 180, an alternate form of the seat ring 104 may include a substantially cylindrical inner surface 178 defining a single cylindrical orifice 180. In one form, the cylindrical orifice 180 may have a longitudinal axis that is generally perpendicular to a plane occupied by the interference portion 176 of the seat ring 104. In another form, the cylindrical orifice 180 may have a longitudinal axis that is disposed at an angle less than ninety-degrees relative to a plane occupied by the interference portion 176 of the seat ring 104. Still further, while the seat ring 104 has been depicted and described hereinabove as including a frustoconical inner surface 178 converging axially downward in relation to the orientation of the pressure regulator 100 as depicted, an alternate form of the seat ring 104 may include a frustoconical inner surface 178 converging axially upward in relation to the orientation of the pressure regulator 100.

Still further, it should be appreciated that while the seat rings 204, 304 depicted and described with reference to FIGS. 5 and 6 have been disclosed as including cylindrical surfaces 268, 368 defining cylindrical orifices 270, 370, alternate forms of the seat rings 204, 304 may include frustoconical surfaces 268, 368 similar to that depicted in FIGS. 2 and 3 defining frustoconical orifices 270, 370. In one form, the frustoconical surfaces 268, 368 may converge axially downward in relation to the orientation of the pressure regulator 100. In another form, the frustoconical surfaces 268, 368 may converge axially upward in relation to the orientation of the pressure regulator 100. Additionally, while the frustoconical orifices of any of the above-described forms have been depicted or described as having axes that are substantially perpendicular to the seat ring 104, 204, 304 in which they are provided, an alternate form of the seat rings 104, 204, 304 may include frustoconical orifices having axes disposed at an angle relative to the seat rings 104, 204, 304 similar to the orifices 370 depicted in FIGS. 6A and 6B. Furthermore, while each of the plurality of orifices 370 in FIGS. 6A and 6B have been described and depicted as being disposed at a common angle relative to the seat ring 304, an alternate form of the seat ring 304 may include a plurality of orifices 370 each disposed at different angles relative to the seat ring 304, wherein some or all of the angles may or may not direct the fluid through the seat ring 304 toward the outlet 112 of the valve body 102. Further yet, another alternate form of the seat ring 304 may include each of the plurality of orifices 370 angled to direct the flow of the fluid toward the center of the through-bores 150, 154 in the mounting subassembly 132. Still further, while each of the orifices 170, 270, 370 in each of the seat rings 104, 204, 304 have been depicted or described as being generally cylindrical or frustoconical, wherein each would have a generally circular cross-section, alternate forms of the present disclosure may include orifices having cross-sections that are other than circular. For example, alternate forms of the orifices may include polygonal cross-sections or any other irregularly shaped cross-sections. Finally, it should be appreciated that while the present disclosure has been provided in the context of a pressure regulator, it may be successfully incorporated into other fluid process control devices including control valves, actuators, and any other foreseeable device.

In light of the foregoing, the description of the present disclosure should be understood as merely providing examples of the present invention and, thus, variations that do not depart from the gist of the invention are intended to be within the scope of the invention.

What is claimed:

1. A control device, comprising:
a valve body defining a flow-path for a fluid;
a seat ring removably attached within the valve body along the flow-path;
a seating surface carried by the seat ring, the seating surface having an outer diameter and an inner diameter that is smaller than the outer diameter;
an actuator coupled to the valve body and including a control member adapted for displacement between an open position and a closed position relative to the seat ring for regulating a flow of the fluid through the flow-path, the control member including a sealing disk and a disk retainer securing the sealing disk to the control member, the disk retainer including a bottom surface and a rim portion, the bottom surface disposed between the sealing disk and the seat ring, the rim portion having a diameter substantially equal to the inner diameter of the seating surface of the seat ring, wherein the sealing disk is adapted to sealingly engage the seating surface of the seat ring when the control member is in the closed position; and
an orifice formed in the seat ring, the orifice disposed within the flow-path and having an average diameter that is smaller than the inner diameter of the seating surface such that the seat ring prevents at least a portion of the flow of the fluid from impacting the sealing disk by directing the portion of the flow of fluid into the bottom surface of the disk retainer.

2. The control device of claim 1, wherein the orifice includes a plurality of orifices.

3. The control device of claim 2, wherein the plurality of orifices are each disposed radially inward of the sealing disk.

4. The control device of claim 1, wherein the seat ring includes a substantially cylindrical sidewall defining the orifice, the substantially cylindrical sidewall having a longitudinal axis disposed substantially perpendicular to a plane in which the seat ring resides.

5. The control device of claim 1, wherein the seat ring includes a substantially cylindrical sidewall defining the orifice, the substantially cylindrical sidewall having a longitudinal axis disposed at an angle less than ninety degrees relative to a plane in which the seat ring resides.

6. The control device of claim 1, wherein the seat ring includes a substantially frustoconical sidewall defining the orifice.

7. The control device of claim 1, wherein the disk retainer seats into the seat ring when the control member is in the closed position.

8. The control device of claim 1, wherein the control member comprises a tubular member and the disk retainer comprises a through-bore in fluid communication with an interior of the tubular member.

9. A control device, comprising:

a valve body defining a flow-path for a fluid;

an actuator coupled to the valve body and including a control member adapted for displacement between an open position and a closed position relative to the valve body for adjusting a capacity of the fluid through the flow-path, the control member including a sealing surface and a disk retainer securing the sealing surface to the control member, the disk retainer including a bottom surface and a rim portion, the bottom surface disposed opposite the sealing surface from the control member; and a seat ring disposed in the flow-path and removably attached to the valve body, the seat ring including:

a seating surface adapted for selective engagement by the sealing surface of the control member, the seating surface having an outer diameter and an inner diameter that is smaller than the outer diameter and substantially equal to the diameter of the rim portion of the disk retainer; and an interference portion extending radially inward from the seating surface and defining at least one orifice through the seat ring to accommodate the fluid flowing through the flow-path, the at least one orifice having an average diameter that is less than the inner diameter of the seating surface.

10. The control device of claim 9, wherein the sealing surface and the at least one orifice are coaxially aligned.

11. The control device of claim 9, wherein the sealing surface and the at least one orifice are axially offset.

12. The control device of claim 9, wherein the at least one orifice includes a plurality of orifices.

13. The control device of claim 12, wherein the plurality of orifices are each disposed radially inward of the sealing surface.

14. The control device of claim 9, wherein the interference portion includes a substantially cylindrical sidewall defining the at least one orifice, the substantially cylindrical sidewall having a longitudinal axis disposed substantially perpendicular to a plane in which the seat ring resides.

15. The control device of claim 9, wherein the interference portion includes a substantially cylindrical sidewall defining the at least one orifice, the substantially cylindrical sidewall having a longitudinal axis disposed at an angle less than ninety degrees relative to a plane in which the seat ring resides.

16. The control device of claim 9, wherein the interference portion includes a substantially frustoconical sidewall defining the at least one orifice.

17. The control device of claim 9, wherein the disk retainer seats into the seat ring when the control member is in the closed position.

18. The control device of claim 9, wherein the control member comprises a tubular member and the disk retainer comprises a through-bore in fluid communication with an interior of the tubular member.

* * * * *

UNITED STATES PATENT AND TRADEMARK OFFICE
CERTIFICATE OF CORRECTION

| | | |
|---|---|---|
| PATENT NO. | : 7,896,028 B2 | Page 1 of 1 |
| APPLICATION NO. | : 11/462473 | |
| DATED | : March 1, 2011 | |
| INVENTOR(S) | : Thomas L. Weyer et al. | |

It is certified that error appears in the above-identified patent and that said Letters Patent is hereby corrected as shown below:

At Column 6, line 36, "depicts" should be -- depict --.

Signed and Sealed this
Fifteenth Day of November, 2011

David J. Kappos
*Director of the United States Patent and Trademark Office*